United States Patent [19]
Yamakoshi et al.

[11] Patent Number: 6,122,126
[45] Date of Patent: *Sep. 19, 2000

[54] DIGITAL MAGNETIC REPRODUCING APPARATUS AND DIGITAL MAGNETIC RECORDING/REPRODUCING APPARATUS EMPLOYING DETECTION OF SECOND HARMONIC DISTORTION AND BIAS CURRENT CONTROL

[75] Inventors: Takamichi Yamakoshi, Kanagawa; Yoshiharu Shimano, Tokyo; Hiroaki Yada, Kanagawa, all of Japan

[73] Assignee: Sony Corporation, Tokyo, Japan

[*] Notice: This patent is subject to a terminal disclaimer.

[21] Appl. No.: 08/475,374

[22] Filed: Jun. 7, 1995

Related U.S. Application Data

[62] Division of application No. 08/284,238, Aug. 2, 1994, abandoned.

[30] Foreign Application Priority Data

Aug. 3, 1993 [JP] Japan .................................. 5-192567

[51] Int. Cl.[7] ................................ G11B 5/03; G11B 5/09
[52] U.S. Cl. ................................................ 360/66; 360/51
[58] Field of Search ................................ 360/53, 65, 66, 360/113, 26, 14.1, 25; 369/13

[56] References Cited

U.S. PATENT DOCUMENTS

| | | | |
|---|---|---|---|
| 4,263,624 | 4/1981 | Gundry | 360/25 |
| 4,280,153 | 7/1981 | Tin | 360/66 |
| 4,706,135 | 11/1987 | Kojima | 360/14.1 |
| 5,182,734 | 1/1993 | Watanabe et al. | 369/13 |
| 5,301,080 | 4/1994 | Ottesen et al. | 360/113 |
| 5,390,054 | 2/1995 | Youngquist et al. | 360/66 |
| 5,424,880 | 6/1995 | Nakano et al. | 360/26 |

*Primary Examiner*—W. Chris Kim
*Attorney, Agent, or Firm*—Hill & Simpson

[57] ABSTRACT

A digital magnetic reproducing apparatus comprises a reproducing head to reproduce data from a magnetic recording medium; an equalizer for shaping, by a partial response method, the waveform of the reproduced signal outputted from the reproducing head; and a decoder for decoding, by a maximum likelihood decoding method, the equalized reproduced signal obtained from the equalizer. The reproducing head employed in this apparatus is an MR (magnetoresistance effect) head which is capable of reducing the second harmonic distortion of the reproduced signal to be −25 dB or lower. Therefore the deterioration of the bit error rate that may result from the nonlinear distortion of the MR head can be further lowered within a sufficiently suppressed range in practical use.

7 Claims, 9 Drawing Sheets

DIGITAL MAGNETIC REPRODUCING APPARATUS AND DIGITAL MAGNETIC RECORDING/REPRODUCING APPARATUS EMPLOYING DETECTION OF SECOND HARMONIC DISTORTION AND BIAS CURRENT CONTROL

This is a division of application Ser. No. 08/284,238, filed Aug. 2, 1994, abandoned.

BACKGROUND OF THE INVENTION

The present invention relates to a digital magnetic reproducing apparatus and a digital magnetic recording/reproducing apparatus using, for example, a magnetic disk as a recording medium.

In the field of digital magnetic recording, there is currently in progress the introduction of a signal processing method which ensures a satisfactory precision of code identification even in a high linear density area with a high-sensitivity magnetoresistance effect head (hereinafter referred to as an MR head) capable of achieving an adequate signal-to-noise ratio even in a narrow track, i.e., a processing method termed PRML (Partial Response Maximum Likelihood) which is a combination of partial response equalization and maximum likelihood decoding.

However, in realization of high surface density recording by the combination mentioned above, there exists the problem in that a data error rate in a channel is deteriorated due to the harmful influence of nonlinear distortion peculiar to an MR head. Such deterioration results from the fact that the PRML method is premised, in principle, on a linear recording/reproducing channel.

SUMMARY OF THE INVENTION

The present invention has been accomplished in view of the problems mentioned. And an object of the invention is to provide a digital magnetic recording apparatus and a digital magnetic recording/reproducing apparatus which are capable of suppressing the deterioration of the data error rate to a practically sufficient range in a digital magnetic reproduction system based on a combination of the PRML method with a reproducing head where the second harmonic distortion of a reproduced signal is adjustable with a bias current.

According to a first aspect of the present invention, there is provided a digital magnetic reproducing apparatus comprising a reproducing head to reproduce data from a magnetic recording medium; an equalizer for shaping, by a partial response method, the waveform of the reproduced signal output from the reproducing head; and a decoder for decoding, by a maximum likelihood decoding method, the equalized reproduced signal obtained from the equalizer. In this apparatus, the reproducing head employed is a magnetic head which is capable of reducing the second harmonic distortion of the reproduced signal to be −25 dB or lower.

According to a second aspect of the present invention, the apparatus further comprises a distortion detector for measuring the second harmonic distortion of the reproduced signal, and a bias current control circuit for controlling a bias current, which flows in the reproducing head, in such a manner as to reduce the second harmonic distortion to be −25 dB or lower.

According to a third aspect of the invention, the apparatus further comprises a decision circuit for making a decision as to whether or not the second harmonic distortion is −25 dB or lower; a measuring circuit for measuring the signal-to-noise ratio of the reproduced signal; and a bias current control circuit supplied with the result outputs of both the decision circuit and the measuring circuit, and controlling the bias current in the reproducing head in such a manner that the signal-to-noise ratio becomes the highest in a range where the second harmonic distortion of the reproduced signal is −25 dB or lower.

According to a fourth aspect of the invention, there is provided a digital magnetic recording/reproducing apparatus consisting of a reproducing section and a recording section. The reproducing section comprises a reproducing head to reproduce data from a magnetic recording medium, an equalizer for shaping, by a partial response method, the waveform of the reproduced signal outputted from the reproducing head; and a decoder for decoding, by a maximum likelihood decoding method, the equalized reproduced signal obtained from the equalizer. And the recording section comprises a clock generator circuit for extracting a clock component from the output signal of the reproducing head and generating a reference clock signal from the extracted clock component; a delay circuit for delaying record data with respect to the reference clock signal; and a recording head for recording the delayed record data from the delay circuit on a magnetic recording medium. In this apparatus, the reproducing head employed is a magnetic head which is capable of reducing the second harmonic distortion of the reproduced signal to be −25 dB or lower.

According to a fifth aspect of the invention, the above apparatus further comprises a distortion detector for measuring the second harmonic distortion of the reproduced signal, and a bias current control circuit for controlling a bias current, which flows in the reproducing head, in such a manner as to reduce the second harmonic distortion to be −25 dB or lower.

And according to a sixth aspect of the invention, the apparatus further comprises a decision circuit for making a decision as to whether or not the second harmonic distortion is lower than −25 dB or lower; a measuring circuit for measuring the signal-to-noise ratio of the reproduced signal; and a bias current control circuit supplied with the result outputs of both the decision circuit and the measuring circuit, and controlling the bias current in the reproducing head in such a manner that the signal-to-noise ratio becomes the highest in a range where the second harmonic distortion of the reproduced signal is −25 dB or lower.

In any of the apparatus mentioned, the reproducing head employed is a magnetoresistance effect head. And the magnetic recording medium employed therein is a magnetic disk.

Due to the use of such a reproducing head capable of reducing the second harmonic distortion of its reproduced signal to be −25 dB or lower, deterioration of the data error rate can be suppressed within twice as compared with the distortionless condition relative to the data decoded by a combination of the partial response waveform equalization and the maximum likelihood decoding. Consequently it becomes possible to minimize the data error rate to a practically permissible range regardless of the nonlinear distortion peculiar to the reproducing head.

The above and other features and advantages of the present invention will become apparent from the following description which will be given with reference to the illustrative accompanying drawings.

DESCRIPTION OF THE PREFERRED EMBODIMENTS

Hereinafter preferred embodiments of the present invention will be described in detail with reference to the accompanying drawings.

(1) Conditions requisite for MR head

Figure 1:
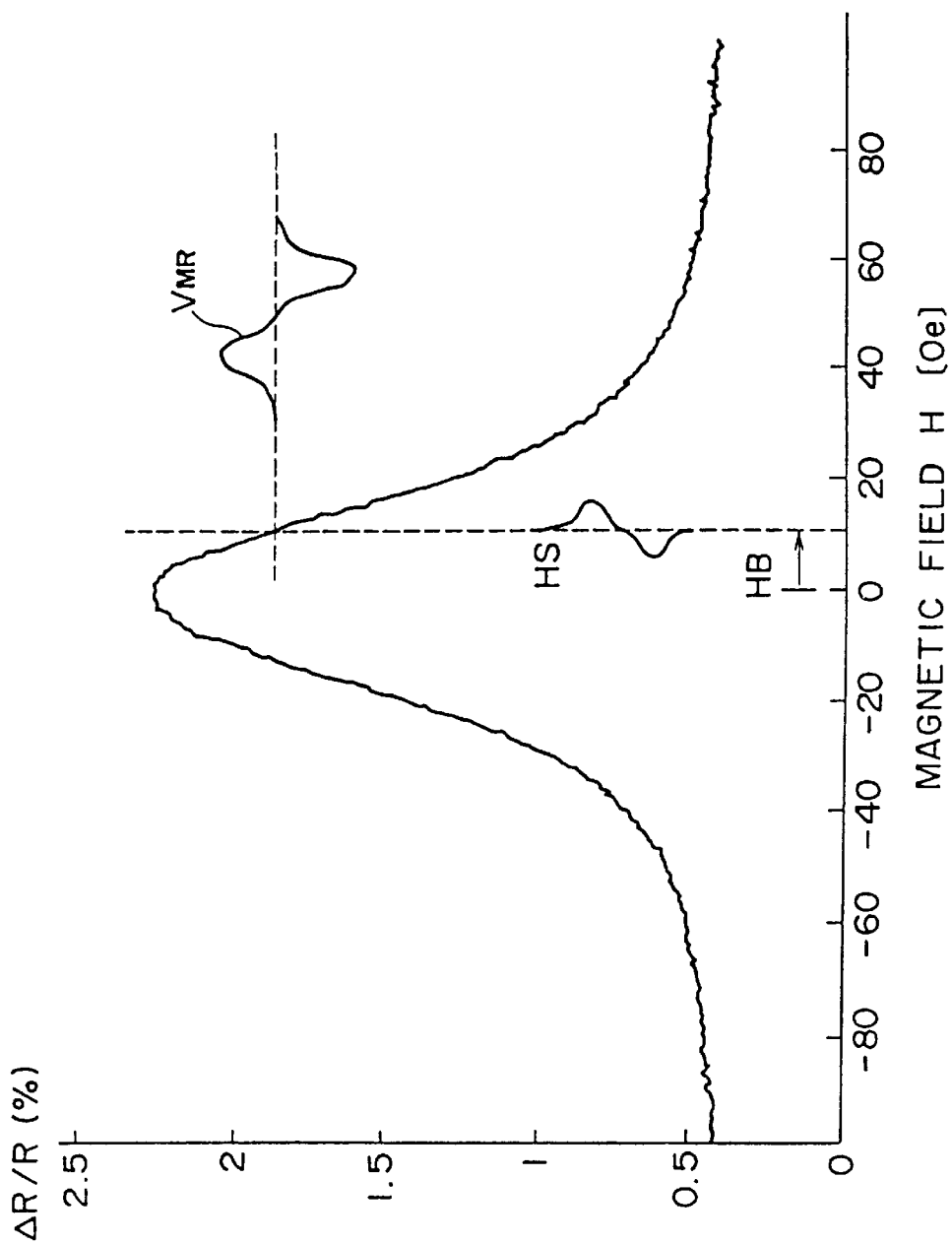
FIG. 1 graphically shows characteristic curves depicting the operation of an MR head.

A general MR head has such magnetic field-to-electric resistance conversion characteristic such as that shown in FIG. 1. The MR head operates to convert a signal magnetic field HS into a reproduced voltage VMR centering at its operation point preset by a DC bias magnetic field HB. However, since the magnetic field-to-electric resistance conversion characteristic is nonlinear, the reproduced voltage VMR is prone to have a distortion of nonsymmetry with respect to the horizontal center line. As the nonlinear distortion causes deterioration of the data error rate, it is necessary to accurately evaluate such nonlinear distortion.

In this embodiment, a second harmonic distortion (SHD) is used for evaluation of such nonlinear distortion. The second harmonic distortion is a value defined by the amplitude ratio of the fundamental wave component of the reproduced signal and the second harmonic component generated due to a nonlinear response of the head. The advantage achieved by evaluation of the second harmonic distortion resides in the point that the nonlinear distortion caused by the MR head can be observed substantially as a fixed value regardless of the frequency characteristic of the head or the measuring frequency thereof.

Figure 2:
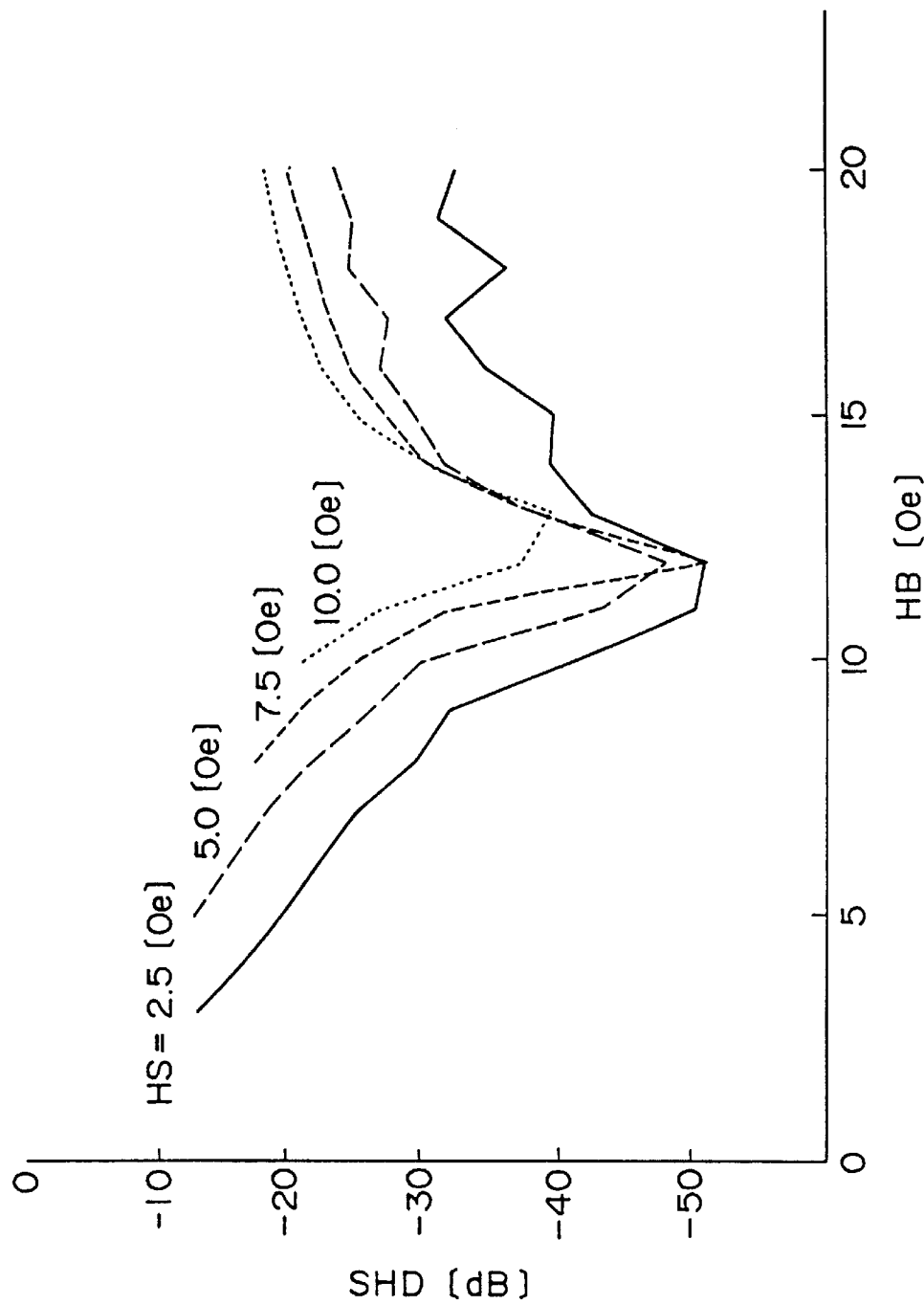
FIG. 2 graphically shows characteristic curves depicting the dependency of a second harmonic distortion on a bias magnetic field.

In checking the dependency of the data error rate on the second harmonic distortion, it is necessary to change the second harmonic distortion of the reproduced waveform to be synthesized. If the second harmonic distortion is acquired by calculation on the basis of the MR operation curve, the distortion can be signified as a function of the bias magnetic field EB and the signal magnetic field amplitude HO. Such dependency is graphically shown in FIG. 2.

Figure 3:
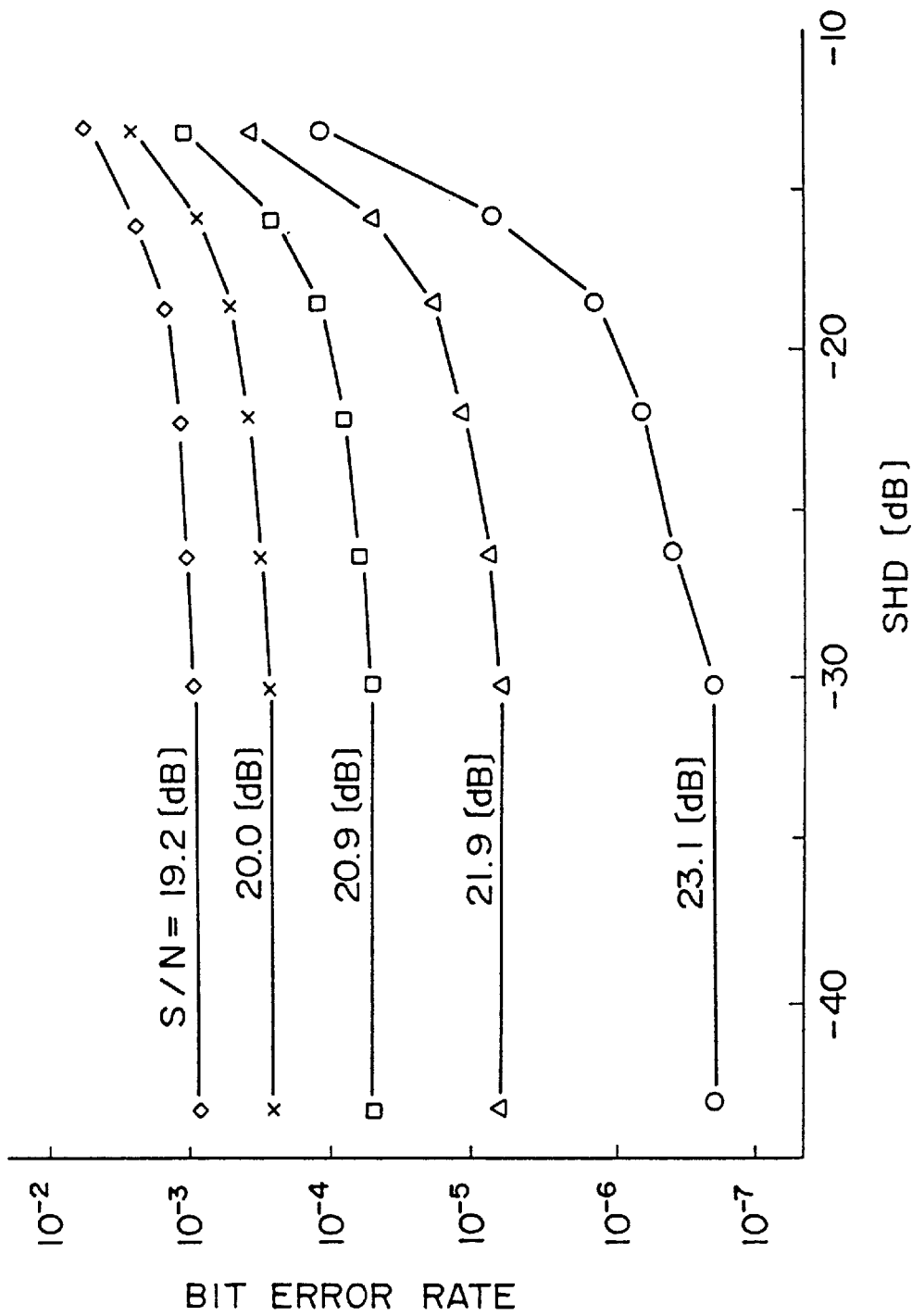
FIG. 3 graphically shows characteristic curves depicting the dependency of a bit error rate on a second harmonic distortion.

FIG. 3 shows the relationship between the second harmonic distortion and the bit error rate calculated with regard to the signal magnetic field amplitude HO (=5 Oe) and the signal-to-noise ratio of the signal magnetic field HS(t) used as a parameter. As expected, the bit error rate deteriorates in accordance with an increase of the second harmonic distortion. The deterioration is more significant in an area where the second harmonic distortion is higher than −20 dB. This characteristic appears to have a substantially fixed tendency regardless of the signal-to-noise ratio. Consequently, for suppressing the deterioration of the bit error rate to be twice the value in the distortionless state by realizing a practically permissible bit error rate ($10^{-6}$ or under), it is necessary to reduce the second harmonic distortion to be −25 dB or lower.

(2) First embodiment

Figure 4:
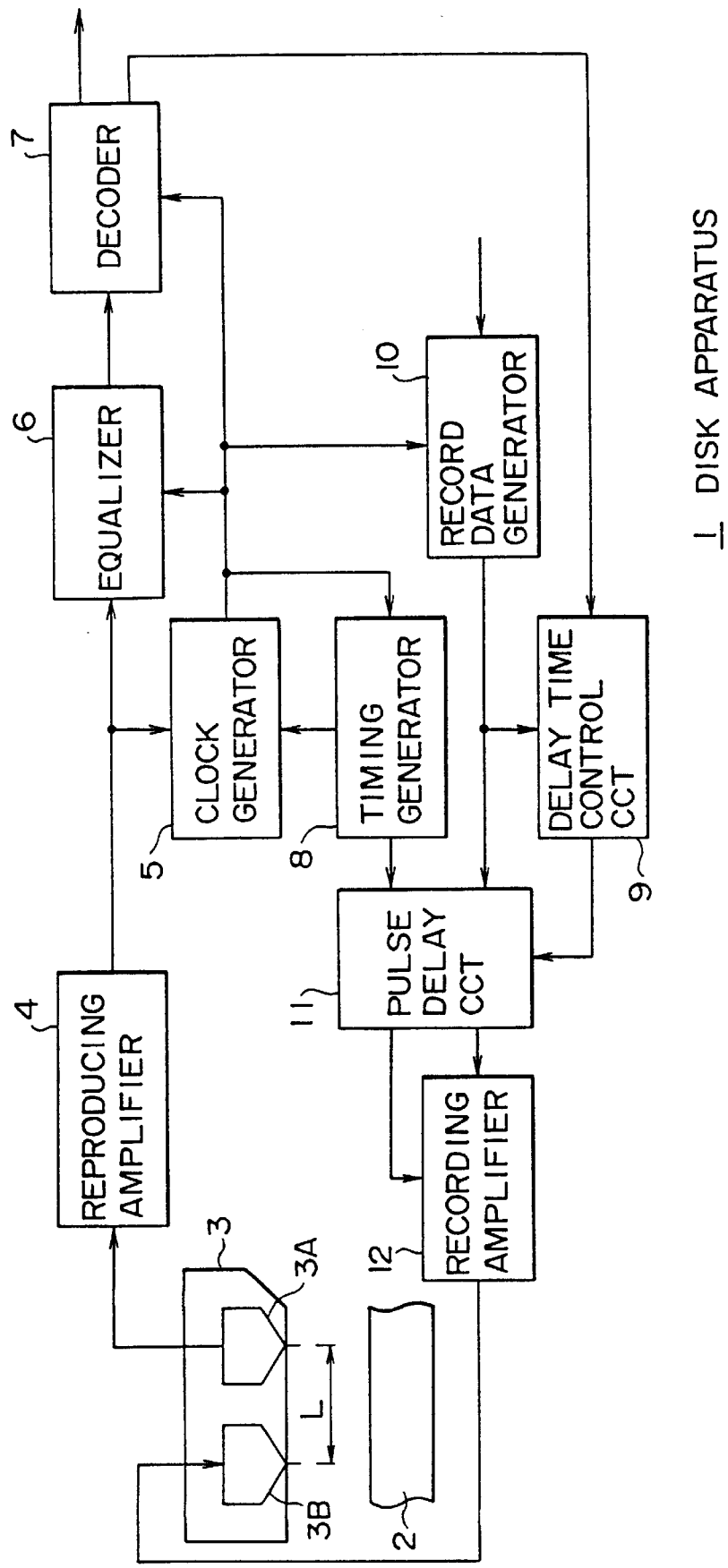
FIG. 4 is a block diagram of a first embodiment representing the digital magnetic reproducing apparatus of the present invention.

FIG. 4 is a block diagram of a first embodiment representing a disk apparatus with a reproducing head 3A used as an MR head which satisfies the above-described conditions.

It is assumed here that the disk apparatus 1 in this embodiment is of the type operated by an external synchronizing system (sample servo system). More specifically, according to this system, clock patterns for generating clock pulses are formed in advance radially and successively on a magnetic disk 2 which is driven to rotate at a constant angular velocity (CAV) by a spindle motor (not shown), and the operation is performed on the basis of a signal produced from such clock patterns.

The clock patterns are formed by DC magnetization unidirectionally at 100 to 1000 positions per rotation to generate high-precision clock pulses.

The head 3A reproduces signals corresponding to data recorded in data segments and also signals corresponding to the clock patterns, and supplies such reproduced signals via a reproducing amplifier 4 to a clock generator circuit 5, an equalizer 6 and a decoder 7.

This embodiment employs an MR head adapted for satisfying the aforementioned conditions, i.e., the second harmonic distortion of the reproduced signal is −25 dB or lower. The reproducing head 3A is positionally spaced apart by a distance L in its moving direction from the recording head 3B, thereby constituting a head 3 which has separate recording and reproducing functions.

Figure 5:
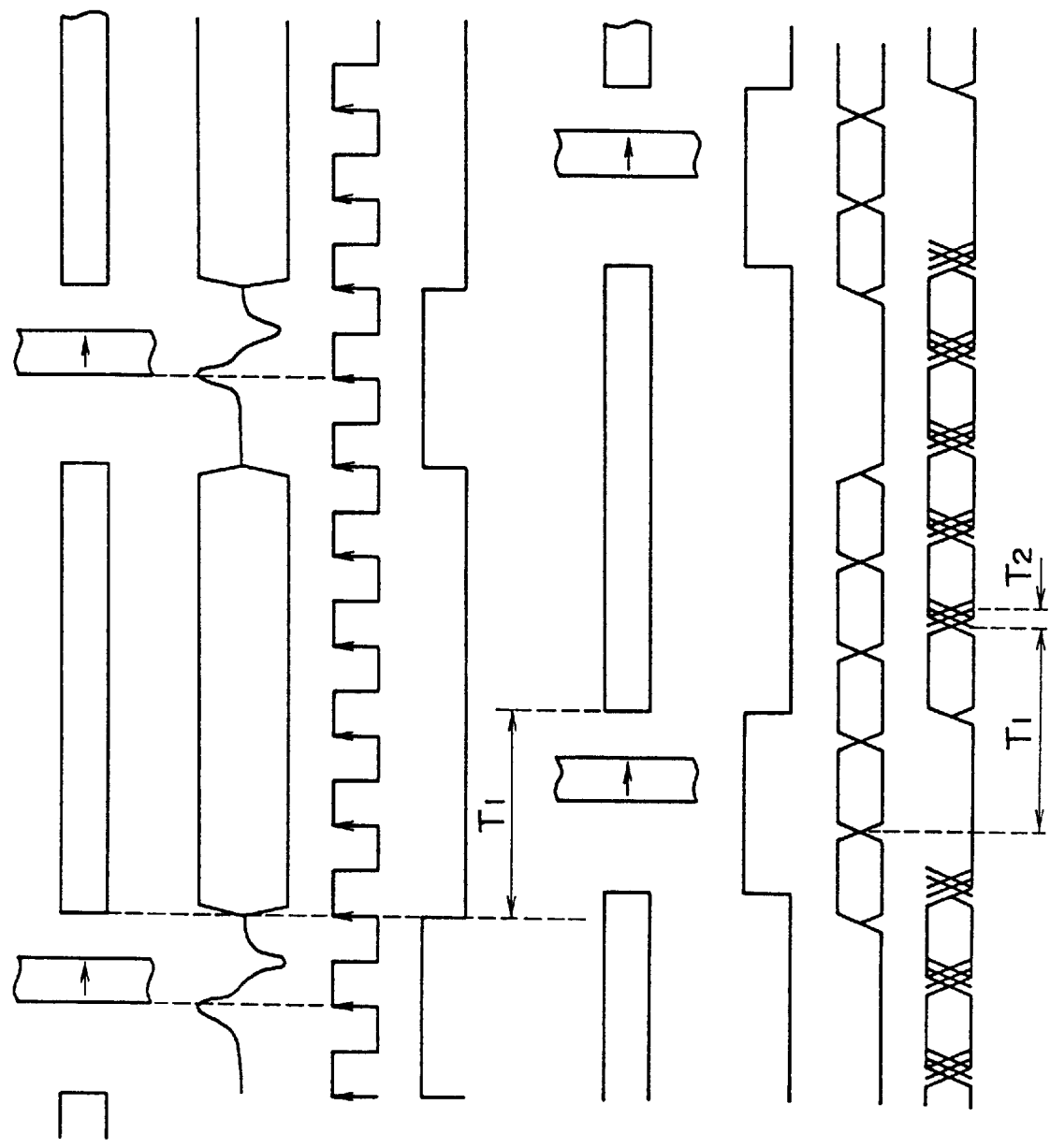
FIG. 5 is a timing chart of signals for explaining the operation of the digital magnetic reproducing apparatus.

The clock generator circuit 5 comprising a PLL (phase locked loop) and so forth generates clock pulses from the reproduced signals corresponding to the clock patterns and then supplies such clock pulses to the individual circuits. FIG. 5 is a timing chart showing how such clock pulses are generated.

When the reproducing head 3A reproduces the clock patterns DC-magnetized in one direction (indicated by arrows) as shown in FIG. 5(A), signals of isolated waveforms are reproduced by the leading and trailing edges of the clock patterns as shown in FIG. 5(B).

The clock generator circuit 5 recognizes, as regular clock patterns, the isolated waveforms appearing in the period during which a clock gate signal is existent, and renews the phase of the PLL circuit in such a manner that, as shown in FIG. 5(C), the leading edge of each clock pulse is synchronized with the peak of the isolated waveform corresponding to the leading edge, thereby generating clock pulses which are phase-locked to the clock patterns 3.

A timing generator 8 is provided for generating a clock gate signal required for production of such clock pulses. The timing generator 8 counts the clock pulses supplied thereto from the clock generator circuit 5 and, on the basis of the past hysteresis, predicts the period of appearance of the reproduced signal corresponding to the clock pattern. The clock gate signal indicative of such period is supplied to the clock generator circuit 5. The timing generator circuit 8 further serves to produce a switching signal which is used for switching a recording mode and a reproduction mode as shown in FIG. 5(D).

First the operation in the reproduction mode will be described below. In this mode, the equalizer 6 and the decoder 7 discriminate the reproduced signal with reference to the rise time (hereinafter referred to as data existent phase) of the clock pulse, and decode the reproduced signal to thereby reproduce the data recorded on the magnetic disk 2.

In this embodiment, the art of partial response equalization is adopted for the equalizer 6, and the art of maximum likelihood decoding for the decoder 7. The decoder 7 reproduces the position data of the head 3 in the radial direction of the disk on the basis of the reproduced signal and then supplies such position data to a delay time control circuit 9.

Meanwhile in the recording mode, a record data generator 10 operates in response to clock pulses. More specifically, the record data generator 10 converts input source data into record data, which are synchronized with the clock pulses, by a predetermined method of modulation suited for recording, and then supplies the record data to both a pulse delay circuit 11 and the delay time control circuit 9.

Under control of the delay time control circuit 9, the pulse delay circuit 11 compensates for the positional deviation of the data that results from the distance L between the reproducing head 3A and the recording head 3B in the moving direction thereof. This compensation needs to be performed due to the presence of a time lag between the track pattern (FIG. 5(E)) seen from the recording head 3B and the track pattern (FIG. 5(A)) seen from the reproducing head 3A.

In this stage of the operation, the pulse delay circuit 11 delays the record data (FIG. 5(G)) inputted from the record data generator 10, so as to compensate for the positional deviation in the inversion of magnetization caused by the time lag and also for the phase deviation (nonlinear bit shift) in the inversion of magnetization depending on the pattern of the record data, and then outputs the record data delayed as shown in FIG. 5(H). The pulse delay circuit 11 further serves to delay the switching signal (FIG. 5(D)) inputted from the timing generator 8, thereby producing a write enable signal (FIG. 5(F)).

A recording amplifier 12 amplifies the record data thus delayed, and then supplies to the recording head 3B a current corresponding to the record data, whereby the data is recorded on the magnetic disk 2.

According to the construction described above, the error rate caused by the signal processing in the decoder 7 can be suppressed to $10^{-6}$ or so due to the use of the MR reproducing head 3A where the second harmonic distortion of the reproduced signal can be reduced −25 dB or below. Consequently it becomes possible to obtain an improved disk apparatus 1 which is capable of minimizing the deterioration of the error rate that results from the nonlinear distortion.

(3) Second embodiment

The first embodiment mentioned above represents a general disk apparatus where the second harmonic distortion in the MR reproducing head 3A is −25 dB or lower. Now a description will be given on a second embodiment representing a particular disk apparatus where a bias magnetic field (bias current), which minimizes the second harmonic distortion of an MR head capable of satisfying the above condition, is substantially coincident with a bias magnetic field (bias current) which enhances the signal-to-noise ratio to the optimum 7.

Figure 6:
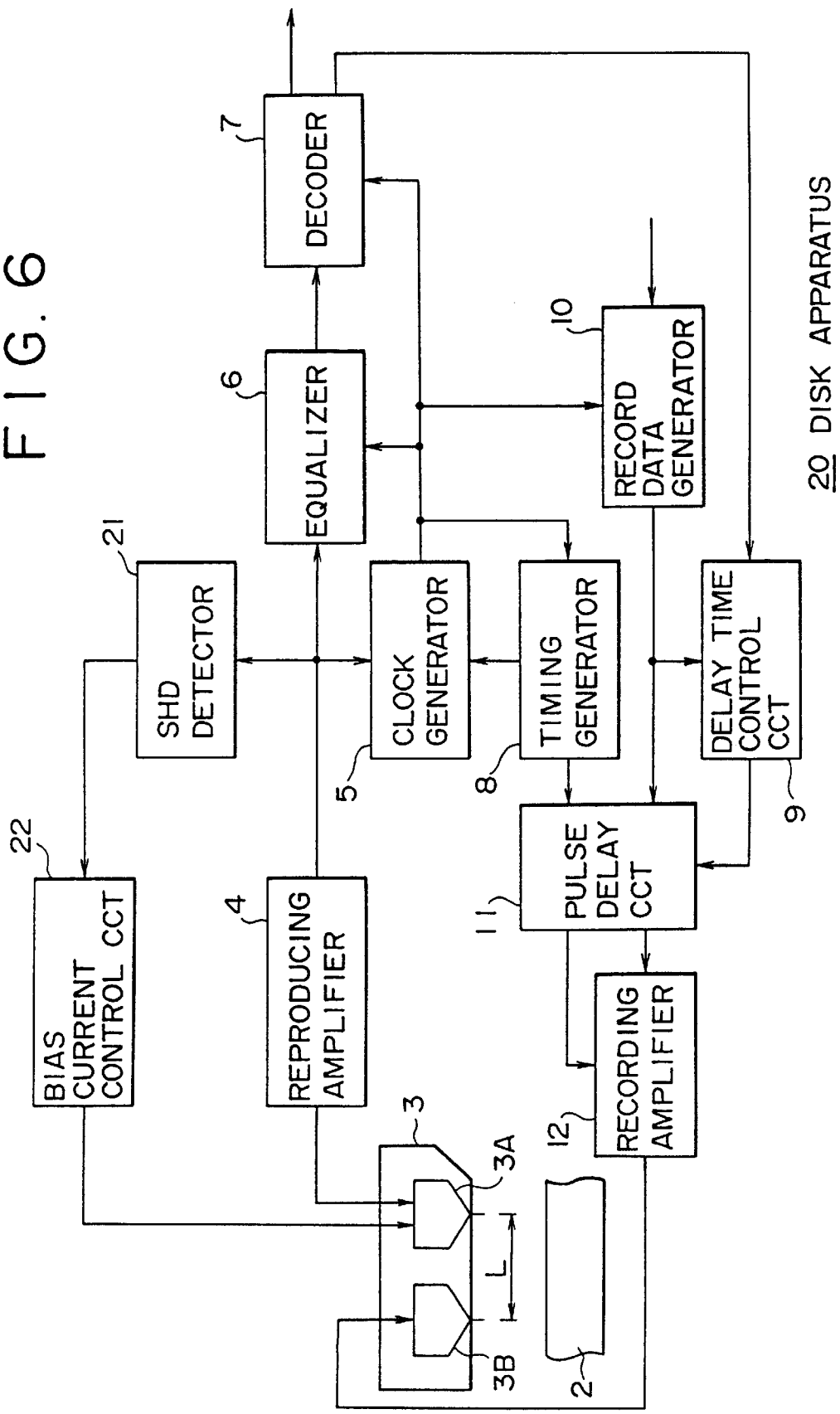
FIG. 6 is a block diagram of a second embodiment representing the digital magnetic reproducing apparatus of the invention.

In FIG. 6 where like reference numerals denote like component circuits corresponding to those in FIG. 4, a disk reproducing apparatus 20 is shown as a whole. This disk reproducing apparatus 20 is similar in construction to the aforementioned first embodiment except that it further comprises a second harmonic distortion (SHD) detector 21 for detecting the second harmonic distortion of a reproduced signal, and a bias current control circuit 22 for controlling, on the basis of the result of such detection, a bias current (bias voltage) supplied to a reproducing head 3A.

Figure 7:
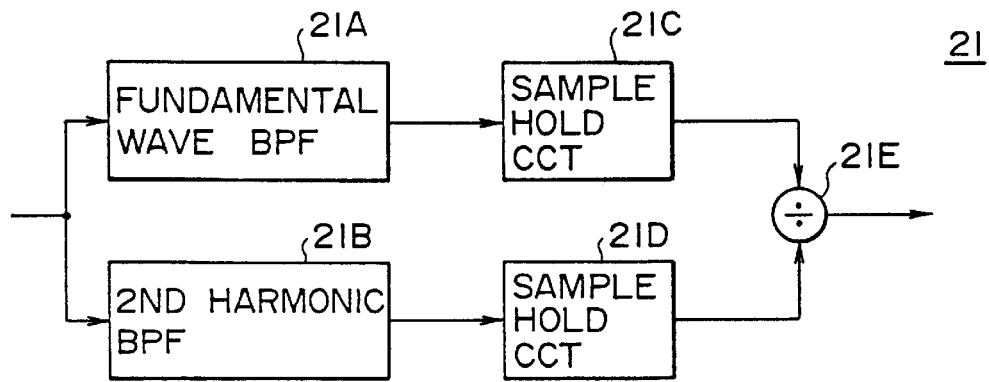
FIG. 7 is a block diagram of an exemplary circuit of a second harmonic distortion detector.

The second harmonic distortion detector 21 is so constructed as shown in FIG. 7. In the second harmonic distortion detector 21, a reproduced signal is inputted to two band pass filters 21A and 21B, where a fundamental wave component and a second harmonic component are extracted respectively.

The amplitude values of such signal components extracted by the band pass filters 21A and 21B are detected by sample holding circuits 21C and 21D respectively, and the ratio of the two values is calculated by a divider 21E so that the second harmonic distortion is detected.

Figure 8:
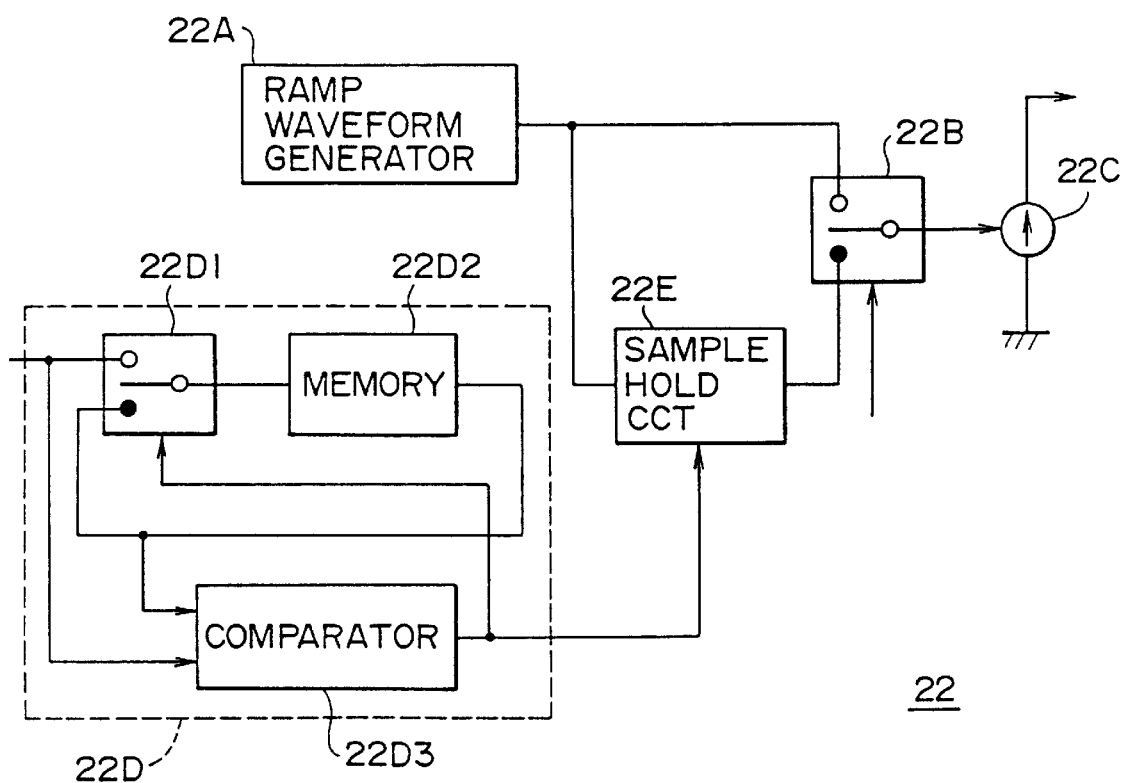
FIG. 8 is a block diagram of an exemplary circuit of a minimum point detector.

Meanwhile the bias current control circuit 22 is so constructed as shown in FIG. 8. The bias current control circuit 22 comprises a functional part for detecting an optimal bias current relative to the reproducing head 3A, and another functional part for holding an optimal bias current.

The bias current control circuit 22 applies a current value setting voltage, which is outputted from a ramp waveform generator 22A, to a voltage-controlled current source 22C via a switch 22B, whereby the bias current is varied so that the minimum point of the second harmonic distortion obtained during the above period can be detected by a minimum point detector 22D.

The minimum point detector 22D is so constructed that the second harmonic distortion obtained from the reproduced signal is compared by a comparator 22D3 with the value stored in a memory 22D2. When the result of a decision signifies that the second harmonic distortion obtained from the reproduced signal is smaller than the value stored in the memory 22D2, a switch in a switching circuit 22D1 is turned to its white-circle side in FIG. 8, whereby the value stored in the memory 22D2 is updated to the new value.

The minimum point detector 22D outputs a control signal to the sample holding circuit 22E every time the minimum value of the second harmonic distortion is updated, and holds the current-value setting voltage at that instant. More specifically, the value held in the sample holding circuit 22E is continuously updated until the second harmonic distortion of the reproduced signal passes through the minimum point.

During a search for the current-value setting voltage which applies an optimal bias current, a switch in a switching circuit 22B is connected to its white-circle side in FIG. 8 and, after completion of scanning the ramp waveform, the switch is turned to its black-circle side, whereby the second harmonic distortion during the operation of the disk apparatus 1 is maintained in the optimal state.

Since the bias current suited for minimizing the second harmonic distortion of the reproducing head 3A employed in this embodiment is substantially coincident with the bias current for enhancing the signal-to-noise ratio to the best, the signal-to-noise ratio is rendered maximum relative to the reproduced signal from the head 3A where such set bias current flows, hence realizing full utilization of the performance of the magnetic disk reproducing apparatus to consequently lower the error rate.

(4) Third embodiment

The foregoing second embodiment is premised on that the bias magnetic field (bias current), which is suited for minimizing the second harmonic distortion of the MR head where the second harmonic distortion can be lowered −25 dB or below, is substantially coincident with the bias magnetic field (bias current) for enhancing the signal-to-noise ratio to the best. In contrast therewith, the third embodiment represents another exemplary disk apparatus where an optimal bias current is settable when such coincidence is not ensured.

Figure 9:
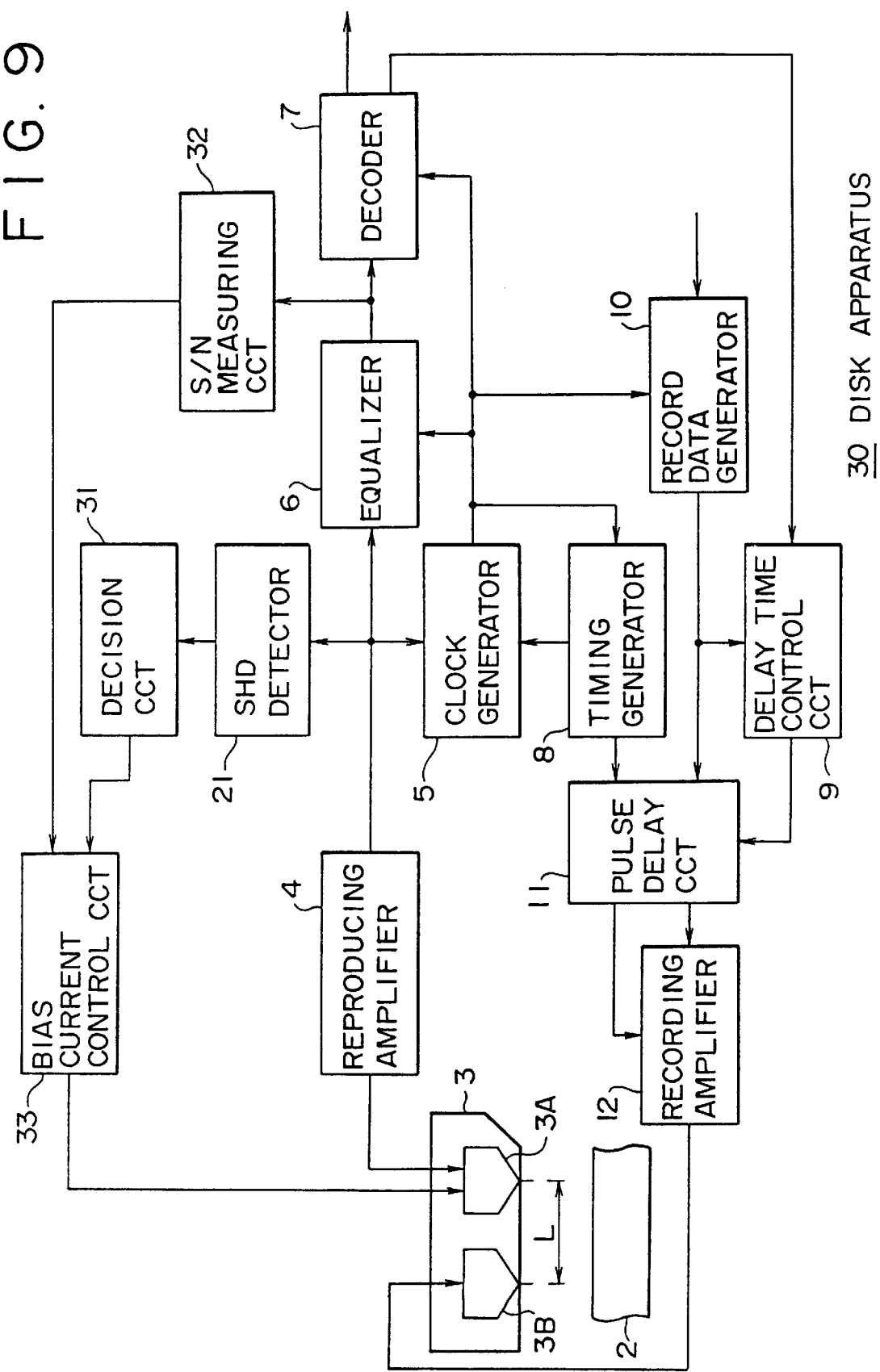
FIG. 9 is a block diagram of a third embodiment representing the digital magnetic reproducing apparatus of the invention.

In FIG. 9 where like reference numerals denote like component circuits corresponding to those shown in FIG. 6, a disk apparatus 30 further comprises a decision circuit 31 for making a decision as to whether the aforementioned condition of prescribing the second harmonic distortion to −25 dB or less is satisfied or no., and an S/N measuring circuit 32. In this third embodiment, a bias current control circuit 33 shown in FIG. 10 is employed for setting an optimal bias current on the basis of the result of the decision relative to the distortion level and the result of measuring the signal-to-noise ratio.

Figure 10:
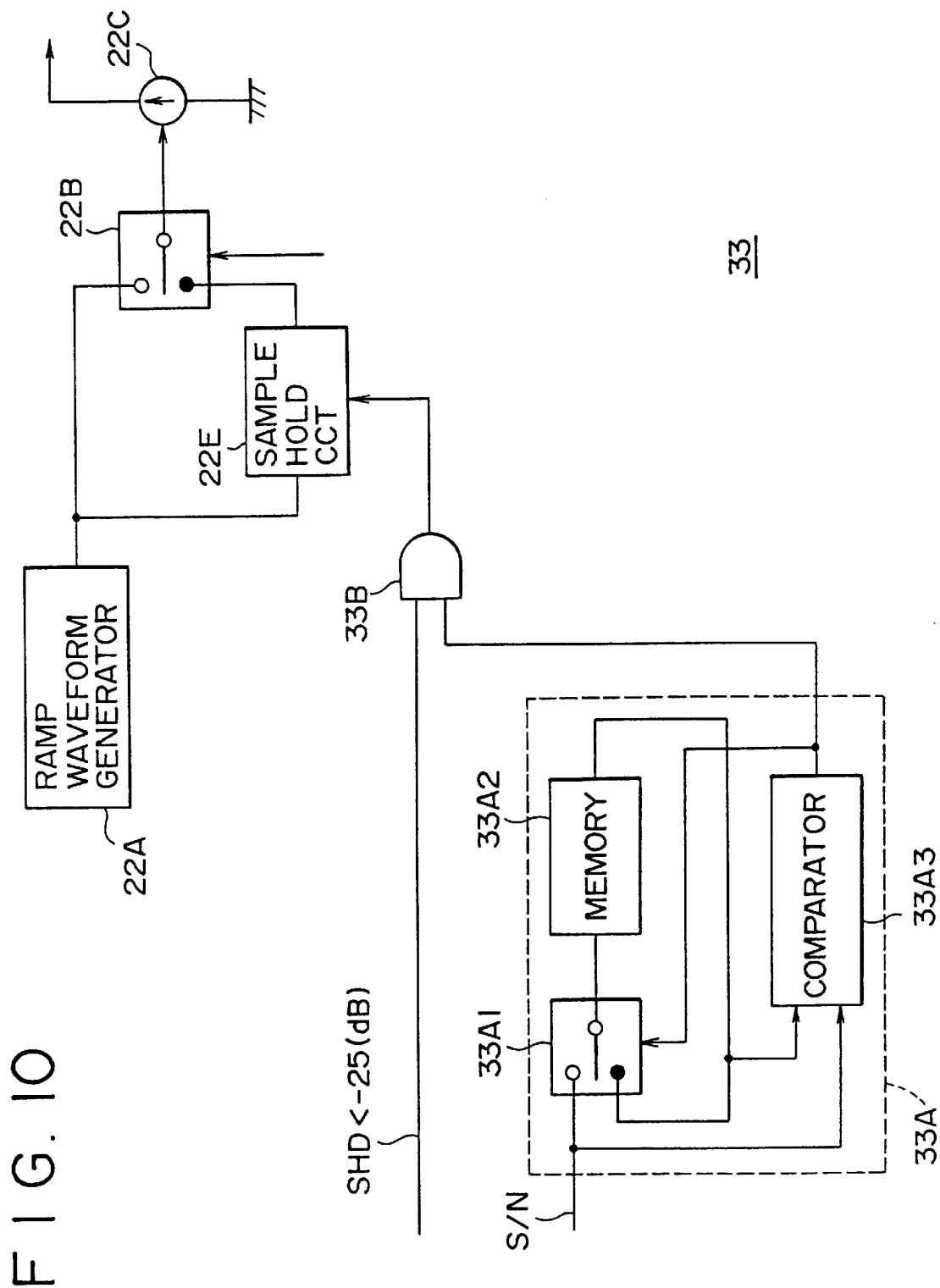
FIG. 10 is a block diagram of an exemplary circuit of a maximum value detector.

As shown in FIG. 10 where like reference numerals denote like component circuits corresponding to those in FIG. 8, the bias current control circuit 33 includes a maximum value detector 33A for detecting the best point of the signal-to-noise ratio, in place of the aforementioned minimum point detector 22D which is used for detection of the minimum point relative to the second harmonic distortion, and further includes an AND circuit 33B for taking an AND logic product of the result output of the detector 33A and that of the decision circuit 31.

The maximum value detector 33A is so formed that, only when the signal-to-noise ratio inputted thereto is higher than the ratio stored in a memory 33A2, such ratio in the memory 33A2 is updated to the new value.

The AND circuit 33B is so formed that, only when the aforementioned conditions are satisfied as the second harmonic distortion obtained from the reproduced signal is −25 dB or lower and the signal-to-noise ratio is the highest at the present instant, a control signal is outputted to renew the current-value setting voltage held in the sample holding circuit 22E.

According to the construction mentioned, a bias current of an adequate value for achieving the highest signal-to-noise ratio within a conditional range of lowering the second harmonic distortion −25 dB or below can be caused to flow in the reproducing head 3A, so that even if the response characteristic of the reproducing head 3A has some variation, it is still possible to realize a satisfactory disk apparatus which is capable of performing its operation at the minimized data error rate.

(5) Other embodiment

Each of the above embodiments represents an exemplary disk apparatus having both a recording section to record data on a disk and a reproducing section to reproduce the data from the disk. However, it is to be noted that the present invention is not limited to such embodiments alone and may also be applied to a type having merely a reproducing section.

Moreover, although each of the above embodiments is concerned with an exemplary case of using an MR head as the reproducing head 3A, the present invention is widely applicable to any other case of using a magnetic head where its second harmonic distortion is adjustable by a bias current.

Further in addition to the above embodiments representing a disk apparatus, the present invention is applicable also to any digital magnetic reproducing apparatus which employs an MR reproducing head and adopts the PRML method for signal processing.

What is claimed is:

1. A method of adjusting a magnetic head bias current comprising the steps of:
   a) measuring a second harmonic distortion of a reproduced signal; and
   b) adjusting the magnetic head bias current to maintain the second harmonic distortion at a value below −25 dB.

2. A digital magnetic reproducing apparatus comprising a reproducing head to reproduce data from a magnetic recording medium; an equalizer for shaping, by a partial response method, a waveform of a reproduced signal output from said reproducing head; and a decoder for decoding, by a maximum likelihood decoding method, an equalized reproduced signal obtained from said equalizer;

said apparatus further comprising:
   a distortion detector for measuring a second harmonic distortion of the reproduced signal; and a bias current control circuit for controlling a bias current, which flows in said reproducing head, to reduce the second harmonic distortion to be −25 dB or lower.

3. The digital magnetic reproducing apparatus of claim 2, wherein said reproducing head is a magnetoresistance effect head.

4. The digital magnetic reproducing apparatus of claim 2, wherein said recording medium is a magnetic disk.

5. A digital magnetic recording/reproducing apparatus comprising :
   a reproducing section comprising a reproducing head to reproduce data from a magnetic recording medium; an equalizer for shaping, by a partial response method, a waveform of the reproduced signal output from said reproducing head; and a decoder for decoding, by a maximum likelihood decoding method, an equalized reproduced signal obtained from said equalizer; and
   a recording section comprising a clock generator circuit for extracting a clock component from the output signal of said reproducing head and generating a reference clock signal from the extracted clock component; a delay circuit for delaying record data with respect to the reference clock signal; a record data generator connected to an output of the clock generator and a recording head for recording the delayed record data from said delay circuit on a magnetic recording medium;

said apparatus further including:
   a distortion detector for measuring a second harmonic distortion of the reproduced signal; and
   a bias current control circuit for controlling a bias current, which flows in said reproducing head, to reduce the second harmonic distortion to be −25 dB or lower.

6. The digital magnetic reproducing apparatus of claim 5, wherein said reproducing head is a magnetoresistance effect head.

7. The digital magnetic reproducing apparatus of claim 5, wherein said recording medium is a magnetic disk.

* * * * *